(12) United States Patent
Altamirano

(10) Patent No.: US 7,025,053 B1
(45) Date of Patent: Apr. 11, 2006

(54) CUTTING TABLE FOR LARGE STONE WORK PIECES

(76) Inventor: Silvano Altamirano, 2529 SW. 18th St., Miami, FL (US) 33145

( * ) Notice: Subject to any disclaimer, the term of this patent is extended or adjusted under 35 U.S.C. 154(b) by 0 days.

(21) Appl. No.: 11/032,631

(22) Filed: Jan. 11, 2005

(51) Int. Cl.
*B28D 1/04* (2006.01)

(52) U.S. Cl. .............................. 125/13.01; 451/23.01; 451/6; 451/12; 269/289; 414/494

(58) Field of Classification Search ............ 451/13.01, 451/23.01, 6, 12, 35; 83/435.12, 811; 269/71, 269/58, 901, 289 R, 289, 284, 281, 905; 118/64; 414/754, 783, 494, 569, 737, 743, 414/779; 271/145
See application file for complete search history.

(56) References Cited

U.S. PATENT DOCUMENTS

| | | | |
|---|---|---|---|
| 407,610 A * | 7/1889 | Price | 119/724 |
| 3,709,003 A * | 1/1973 | Widdowson et al. | 66/222 |
| 4,254,606 A | 3/1981 | Schumacher et al. | |
| 4,446,845 A | 5/1984 | Harding | |
| 4,767,109 A * | 8/1988 | Raketich | 269/61 |
| 5,662,264 A * | 9/1997 | Gustafsson et al. | 228/170 |
| 5,915,334 A | 6/1999 | Cummings et al. | |
| 6,793,564 B1 | 9/2004 | Lupi | |

* cited by examiner

*Primary Examiner*—George Nguyen
(74) *Attorney, Agent, or Firm*—Laurence J. Edson, Esq.; Ruben Alcoba, Esq.; Alcoba Edson, P.A.

(57) ABSTRACT

A cutting table for large stone work-pieces, such as marble includes an axel fixed to a base, and a spinning drum attached to the axel. A brake cooperates with the axel and the drum, either stopping or allowing the drum to rotate around the stationary axel. A mounting-plate attaches to the drum, and the mounting-plate attaches and supports a rectangular frame. On top of the frame, a surface-scaffold attaches by at least one hinge. The hinge, with the assistance of a lifting means, allows the scaffold to move from a position flat upon the frame to a position perpendicular to the frame. A work-surface for cutting large stone pieces attaches to and is supported by the scaffold. To manipulate a large stone work-piece, such as one of marble, a user positions the work-surface perpendicular to the frame and rests the work piece flush next to it. The user then lowers the lifting means, thereby rotating the work-surface and its juxtaposed work piece approximately ninety degrees to a position flat upon the frame. A user can freely rotate the work-surface and, with the assistance of the brake, lock the work surface in a desired position.

11 Claims, 5 Drawing Sheets

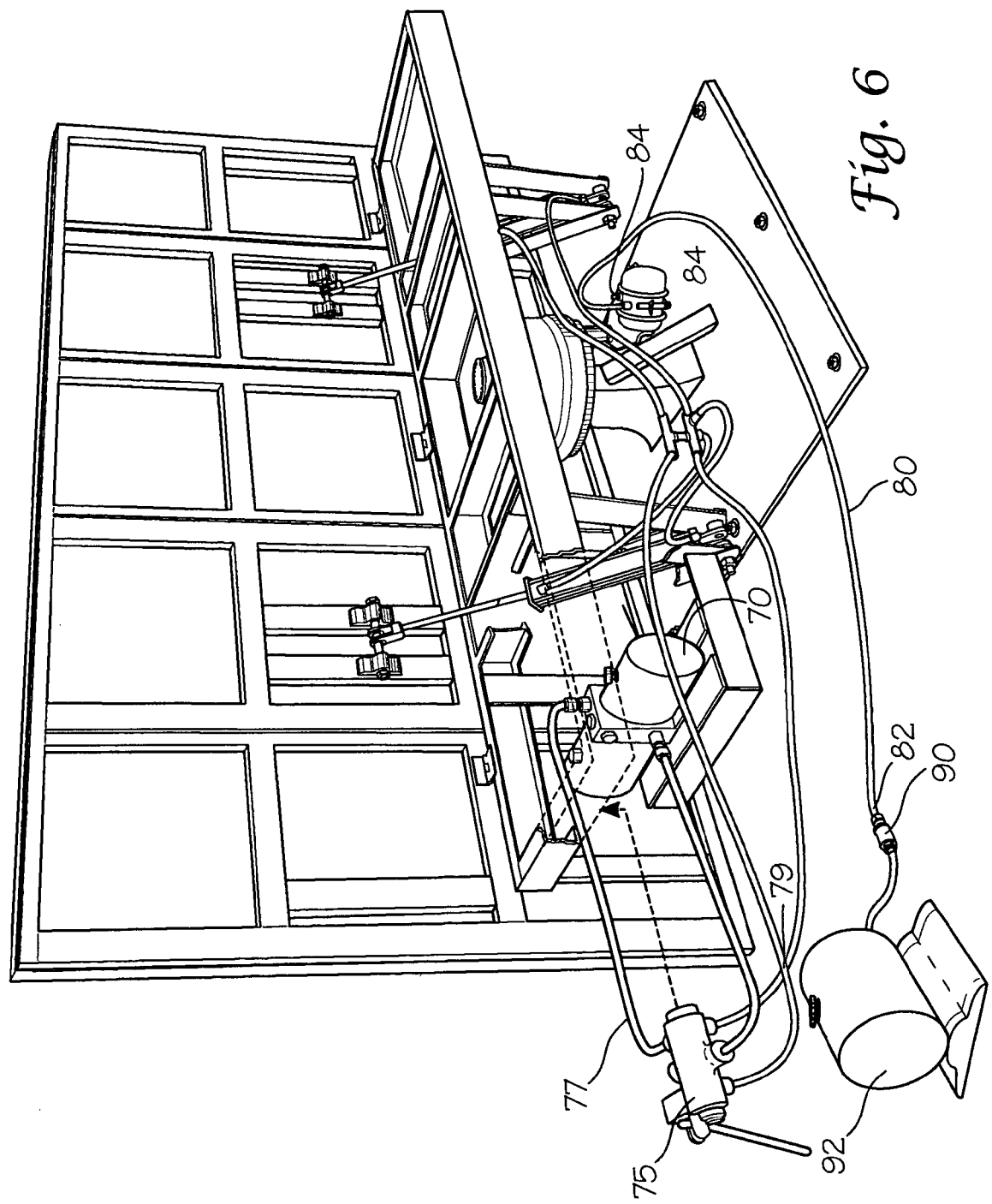

CUTTING TABLE FOR LARGE STONE WORK PIECES

BACKGROUND OF THE INVENTION

1. Introduction

Since the dawn of civilization man has struggled with the problems presented by large rock blocks. Rock is difficult to remove from the earth, heavy to move, and hard to cut. However, when our ancestors wanted to build some thing of permanence, they built it from stone. The Egyptians buried their living gods, once deceased, in the Great Pyramids. The Greeks worshiped at the Acropolis of Athens. The Romans fed Christians to the lions at Rome's Coliseum.

Thankfully, the ingenuity of modern man has created more practical building materials. However, architects and designers cannot resist the creative pull of stone. Marble, especially, is large and heavy, but is also relatively fragile. Raw marble requires a lot of power to manipulate, but the power must be wielded with delicacy. The consequences for rough handling are damaged pieces. The damaged raw material must be either replaced at great economic cost, or repaired with great effort and diminished final quality.

To cut a sheet of marble usually requires at least two workers to carefully lower a sheet of marble onto a stationary cutting table. Then a worker lowers a circular saw onto the sheet, and cuts the marble work piece. The saw is typically well anchored to a stationary rig that allows a user to move the saw in only three directions. First, the saw is moved either left or right to position the saw at the desired place of cut. Then, the user pushes down to start cut, and finally moves the saw across the surface of the work piece to actually make the cut. After the marble work piece is positioned in a horizontal position, the work piece must be moved if the user desires to cut at anything other than a right angle. Hence, manipulating a marble work piece requires the pushing and pulling of a very resistant and massive body.

Further, it is very important that the cutting table be very well anchored. There are tremendous vibrations incidental to the cutting of marble and similar stone. Marble consists of an inconsistent matrix with some portions of it being harder than others. While cutting through a marble sheet, a user may start with a harder area and apply the appropriate pressure. When the saw then reaches a softer area, the cutting means might be pushed with excessive force. A cutting system that fails to restrict lateral motion, produces a sloppy, less than desirable cut.

In sum, the problems faced by one trying to cut a marble sheet are two-fold. First, the user must place the marble work piece onto the work surface of a table for cutting. And then, once so horizontally positioned, the user must maneuver the marble work piece.

2. Field of the Invention

The present invention relates to a cutting table for large stone work-pieces, such as marble, and a method for using the table.

3. Description of the Prior Art

U.S. Pat. No. 4,254,606 to Schumacher, II, et al. is titled, "Self-Contained Gasoline Driven Portable Masonry Saw." A mechanism for swivelling and spring-mounting a machine sub-assembly, mounted to swivel about an axis of rotation, for example the cutting bench of a harvester thresher, which bench is supported on the movable frame of the machine by way of a lifting unit, consisting of a lifting cylinder and piston, and a spring element, a spring element of limited stroke being provided between the lifting unit and its support, and means, such as a hydraulic force transducer or the like, also being provided for the purpose of varying the spring force of the spring element.

U.S. Pat. No. 4,446,845 to Harding is titled, "Self-Contained Gasoline Driven Portable Masonry Saw." Harding teaches a saw for cutting concrete blocks, bricks, marble, tile, stone and other objects. The masonry saw includes a gasoline engine for driving a saw blade through a belt drive arrangement coupled to an arbor shaft on which the blade rotates. The gasoline engine is mounted on a stationary support while the saw blade is pivotally mounted by means of a live pivot shaft for engagement and disengagement with the work-piece. A water trough and pump are provided for wet-cutting. The water pump is connected to an output shaft of the gasoline engine through a belt drive, which may be removed to permit dry-cutting of an object.

U.S. Pat. No. 5,915,334 to Cummings et al., titled, "Hydraulically controlled animal table and method of use" Cummings teaches a hydraulically controlled portable dual table with a gate which enables the examination of a calf or a sheep by restraining the animal while the rotatable tables are vertical with neck and body catches of one table. The table and animal are rotated to a horizontal position for examination, branding, dehorning or castration. The table and animal are returned to a vertical position and the neck and body catches released. The second table is employed to restrain the animal with its neck and body catches and lifted to a horizontal position for examination of the other side of the animal. The operation of the hydraulic controls and the examination can be performed by one person.

U.S. Pat. No. 6,793,564 to Lupi, is self-explanatory titled, "Rotary tool with combined abrasive and fragmentation action for producing profiles or cuts on sheets of fragile material such as marble, granite, stone, glass and the like." Lupi more importantly illustrates the problems associated with marble cutting. Specifically, the problem is one of manipulating heavily and brittle work pieces that potentially can chip or break under the rigors of cutting.

BRIEF SUMMARY OF THE INVENTION

It is an object of the present invention to provide a cutting table for positioning and cutting large, stone, work-pieces, such as marble.

Another object of the present invention is to provide a cutting table with a work surface that tilts from a substantially vertical position, where a flat stone work piece is laid side by side with the work surface, to a horizontal position so that a user might then cut the work piece.

A further object of the present invention is to provide a cutting table that has a work surface that freely turns, horizontally, about an axis, until positioned ideally relative to a cutting means. The user can then lock the work surface in that chosen position preventing the vibrations, incidental to cutting, from moving the work surface.

A further object of the present invention is to provide a cutting table for large stone work-pieces that allows a user to manipulate a work piece with less physically effort, greater speed, and improved precision.

These and other objects of the invention are accomplished by providing a cutting table for large stone work-pieces having an axel fixed to a base, and a spinning drum attached to the axel. A brake cooperates with the axel and the drum, either stopping or allowing the drum to rotate around the stationary axel. A mounting-plate attaches to the drum, and the mounting-plate attaches and supports a rectangular frame. On top of the frame, a surface-scaffold attaches by at least one hinge. The hinge, with the assistance of a lifting means, allows the scaffold to move from a position flat upon the frame to a position perpendicular to the frame. A work-surface for cutting large stone pieces attaches to and is supported by the scaffold.

To manipulate a large stone work-piece, such as one of marble, a user positions the work-surface perpendicular to the frame and rests the work-piece flush, next to it. The user then lowers, with the assistance of the lifting means, the work-surface and the juxtaposed work-piece. They are lowered approximately ninety degrees to a position flat upon the frame. A user can then freely rotate the work-surface and, with the assistance of the brake, lock the work-surface in a desired position.

Other objects and further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWING

The present invention will be better understood from the detailed description given herein below and the accompanying drawings with which are given by way of illustration only.

FIG. 6 is a perspective view of the cutting table of the present invention with the surface-scaffold positioned perpendicular to the rectangular frame and illustrates the separate brake and lift systems.

DETAILED DESCRIPTION OF THE INVENTION

Figure 1:
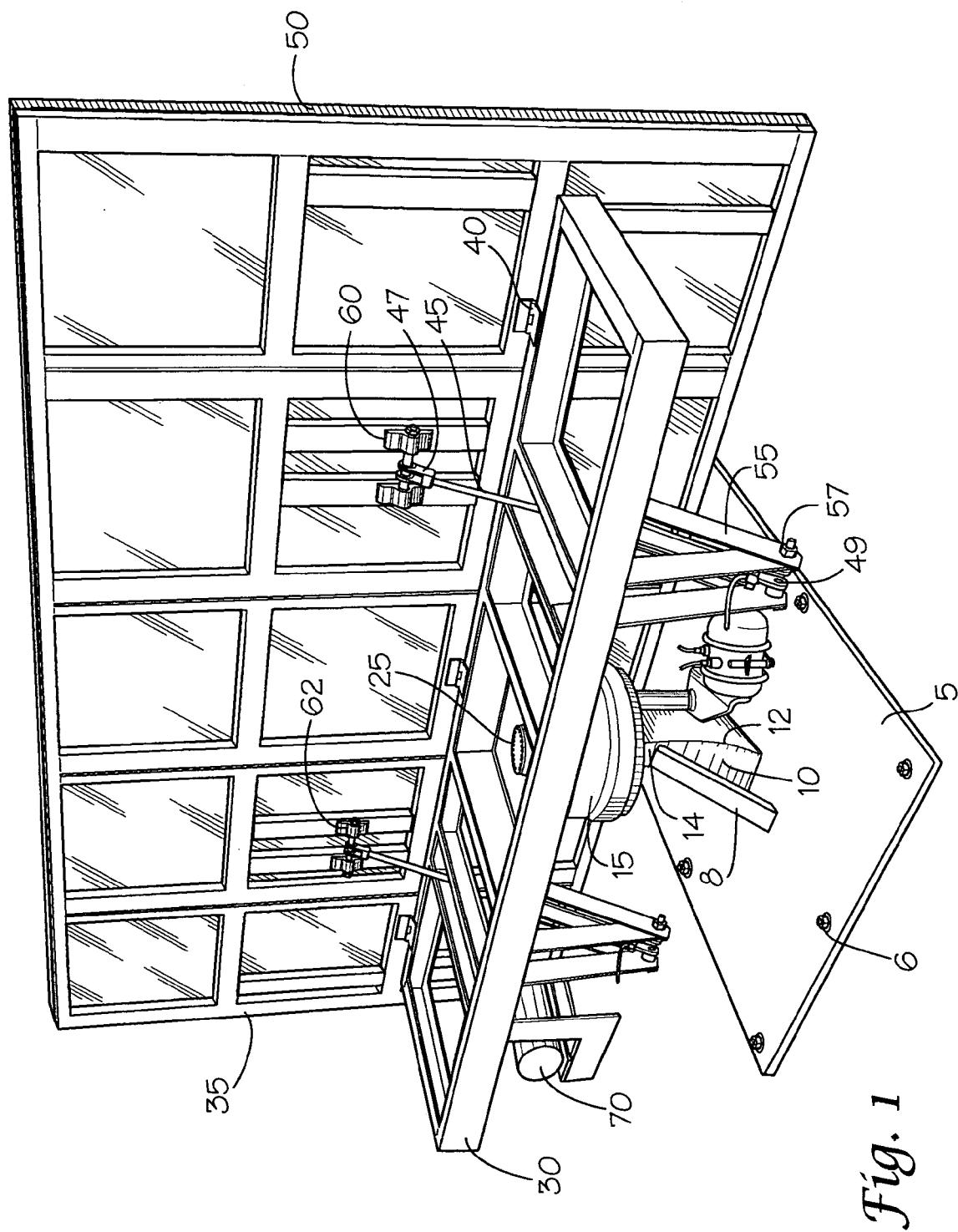
FIG. 1 is a perspective view of the cutting table of the present invention with the surface-scaffold positioned perpendicular to the rectangular frame.

The cutting table of the present invention is illustrated in FIG. 1. Here, one sees presented a perspective view of the presently claimed invention. The cutting table is rather massive, so preferably it is securely anchored to the floor. The base 5 is a rectangular steel plate bolted into the floor with anchor bolts 6. An axel 10 is welded at a right angle to the base 5. The axel 10 is welded at its base end 12. The other end, the drum end 14 has a drum 15. The drum 15 can rotate freely around the axis of the axel 10.

At least one support strut 8 provides lateral stability to the axel 10. The strut 8 is at approximately a forty-five degree angle to the base 5 and the axel 10. Specifically, the strut 8 attaches to the axel 10 just below the drum 15. The support strut 8 can be made of steel.

In one preferred embodiment, the axel 10 is salvaged from a tractor-trailer truck, and the drum 15 is a wheel drum from the same or a similar truck. One aspect of the presently claimed invention is that several elements are salvaged from a tractor-trailer truck.

Using parts salvaged from a truck provides elements possessing great strength. The parts, after all, can withstand the great forces involved in moving a several ton trailer over the highways at high speeds. Thus, the elements are ideally suited for the great mass of the marble work pieces, and the great forces involved in cutting marble.

The drum 15 spins freely, unless the brake 20 is activated. The brake 20 might also be salvaged from a tractor-trailer truck. As such, when activated, the brake 20 stops and locks the drum 15 with the same force as it would a truck on the road. The brake 20 is an airbrake, and as such controlled, by a pressurized air source 92, such as an air compressor.

FIG. 6 illustrates the pneumatic braking system. An air hose 80 having first 82 and second ends 84 attaches to the air brake 20 at the second end 82 off the air hose 80. The first end 82 connects to an air release valve 90. A pressurized air source 92 is connected in series with the air hose 80 and the air release valve 90.

When a user desires to brake the table, the valve 90 allows pressurized air to exit the brake 20. When a user desires the drum 15 and ultimately the work surface 50 of the table to rotate freely, the valve 90 provides pressurized air, thereby disengaging the brake 20.

A mounting-plate 25 attaches to the drum 15. In a preferred embodiment, the mounting-plate 25 replaces the wheel that was attached to the drum 15, when the elements were originally incorporated in the tractor-trailer. Conveniently, standard lug nuts can be used in securing the mounting plate 25. Optionally, the nuts maybe welded on for greater stability. The mounting plate 25 is made of thick, strong steel.

A rectangular frame 30 is welded to the mounting plate 25. The frame 30 is balanced on the mounting plate 25. The frame 30 has at least two perpendicular beams running its length. Between the two beams a plurality of cross beams run the width of the frame 30. In one particular embodiment, the cross beams are at both ends of the frame 30, both ends of the mounting plate 25, and at least one cross-beam is placed between each of the ends of the frame and the ends of the mounting plate 25. The frame 30 must be very strong. Once again, thick steel is ideal.

Attached to the frame 30 by hinges 40 is the surface-scaffold 35. The surface-scaffold 35 is a bit longer than the frame 30, but the scaffold 35 is about three times the width of the frame 30. In FIG. 1 the surface-scaffold 35 is in a perpendicular position relative to the rectangular frame 30. It is in this position that the cutting table can receive a work piece 100. The hinges 40 attach in such a manner that approximately ⅓ of the surface-scaffold 35 lie below the frame 30 when perpendicularly positioned as in FIG. 1. The scaffold 35 has a plurality of beams running its width.

Figure 3:
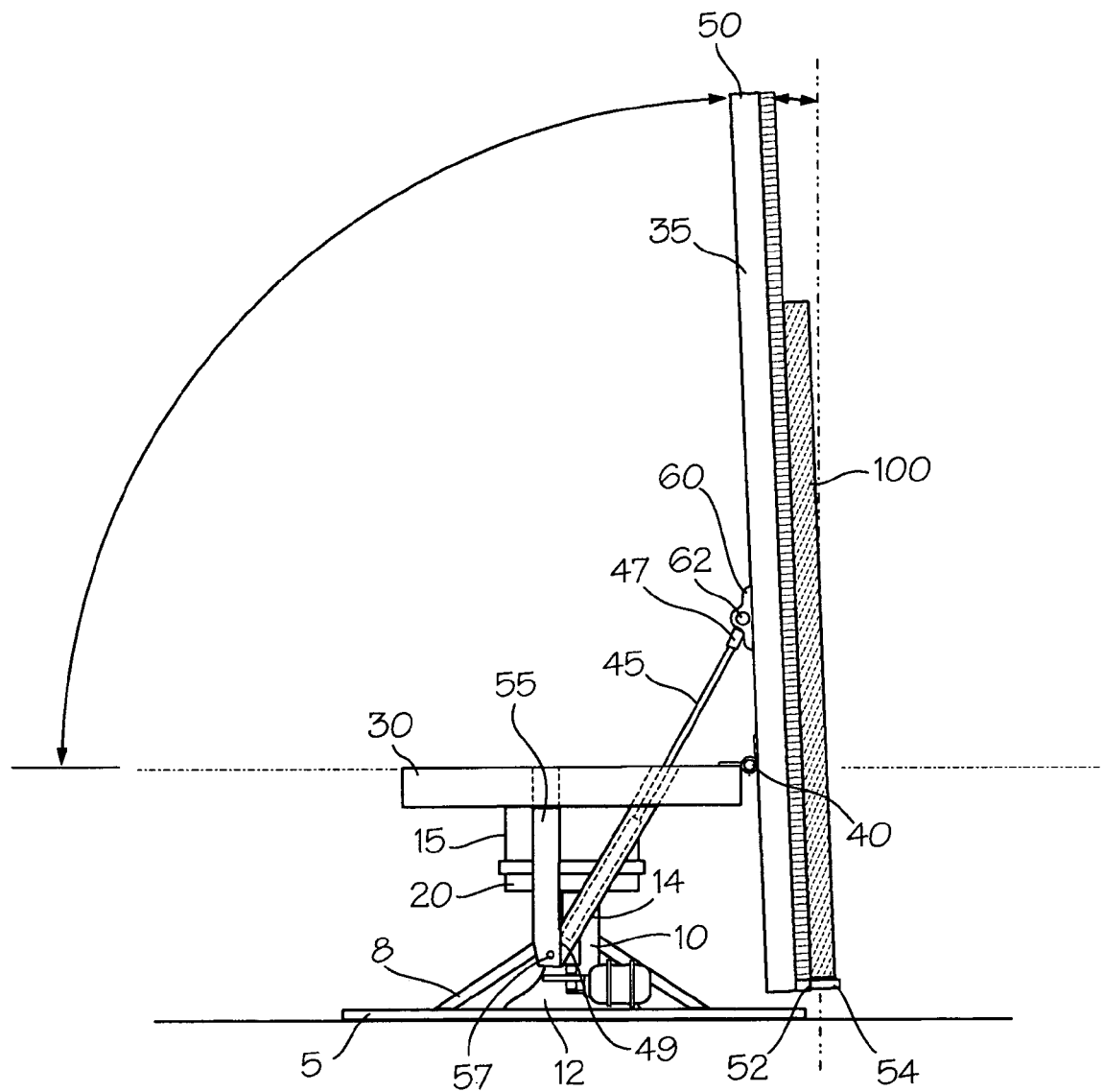
FIG. 3 is a front view of the cutting table of the present invention with the surface-scaffold positioned perpendicular to the rectangular frame, and a work piece juxtaposed flat against the work surface.

The surface-scaffold 35 is so named because it supports the work surface 50. It is the work surface 50 that directly abuts the work piece 100. In FIG. 1, one can only see the edges of the work surface 50 along the right side and top edge of the surface scaffold 35. FIG. 3 showing the front view of the cutting table of the present invention further, and perhaps more clearly, illustrates the work surface 50.

The work surface 50 can be made of any material softer and more consistent than marble. One embodiment uses poured concrete. To make the work surface 50, wet concrete is poured upon the surface-scaffold 35. The concrete dries to produce a level work surface 50. When marble is cut, the saw goes below the marble so the work surface 50 is constantly cut. Under steady use, the work surface 50 has many groves cut into it. After several months of continuous use, the work surface 50 must be re-surfaced. However, all one must do is simply pour and smooth over the work surface 50 with a fresh batch of concrete.

Turning back to FIG. 1, one sees that the lifting means for the surface-scaffold 35 is a pair of hydraulic jacks 45. The jacks 45 have upper 47 and lower 49 ends. The upper ends 47 attach to scaffold brackets 60 approximately in the middle of the surface scaffold 35. The scaffold brackets 60 have a second set of pins 62 to pivotally attach the upper end 47 of the piston to the scaffold bracket 60. The lower ends 49 of the jacks 45 lie below the frame 30 where they are attached by v-mounting brackets 55. A first set of pins 57 pivotally attaches the lower ends 49 to the v-mounting brackets 55.

FIG. 3 shows the jacks 49 fully extended placing the work surface upright. Here, one also sees the work piece 100 being supported below by pegs 54. The pegs 54 are placed in notches 52. The pegs 54 prevent the work piece 100 from sliding or moving as the work surface 50 is tilted into a horizontal position. Once the work surface 50 is in a horizontal position the pegs 54 can be removed from their respective notches 52 so that a user might freely move over the work surface 50.

Figure 2:
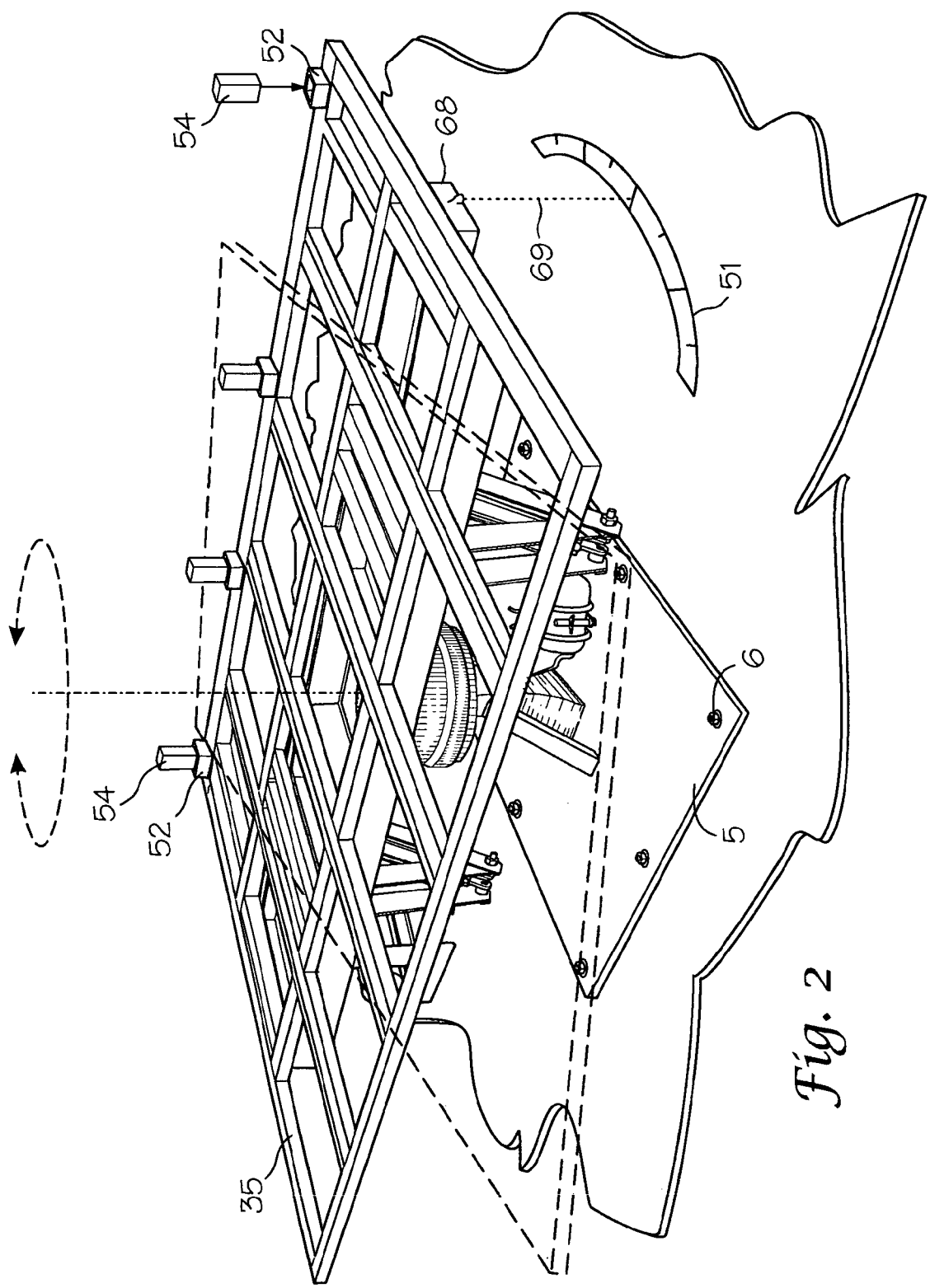
FIG. 2 is a perspective view of the cutting table of the present invention with the surface-scaffold flat upon the rectangular frame, and the axis of rotation for the surface-scaffold about the drum.

FIG. 2 shows the surface-scaffold 35 in a horizontal position. The work surface 50 has been removed to show the elements below it. This figure illustrates the cutting table of the present invention before forms are placed around the surface-scaffold 35 and concrete is poured to create the work surface 50. FIG. 2 illustrates the range of motion the surface scaffold 35 has around the axel 10.

FIG. 2 also illustrates an angle gauge for setting the work surface 50, around the axis of the axel 10 at a particular angle relative to a predetermined point. One embodiment contemplates the use of a laser level 68 aiming a laser beam 69 at the floor where a gauge 51 on the floor indicates the position of the work surface 50. When the surface is ideally positioned the user can then lock it in place with the brake 20.

Figure 4:
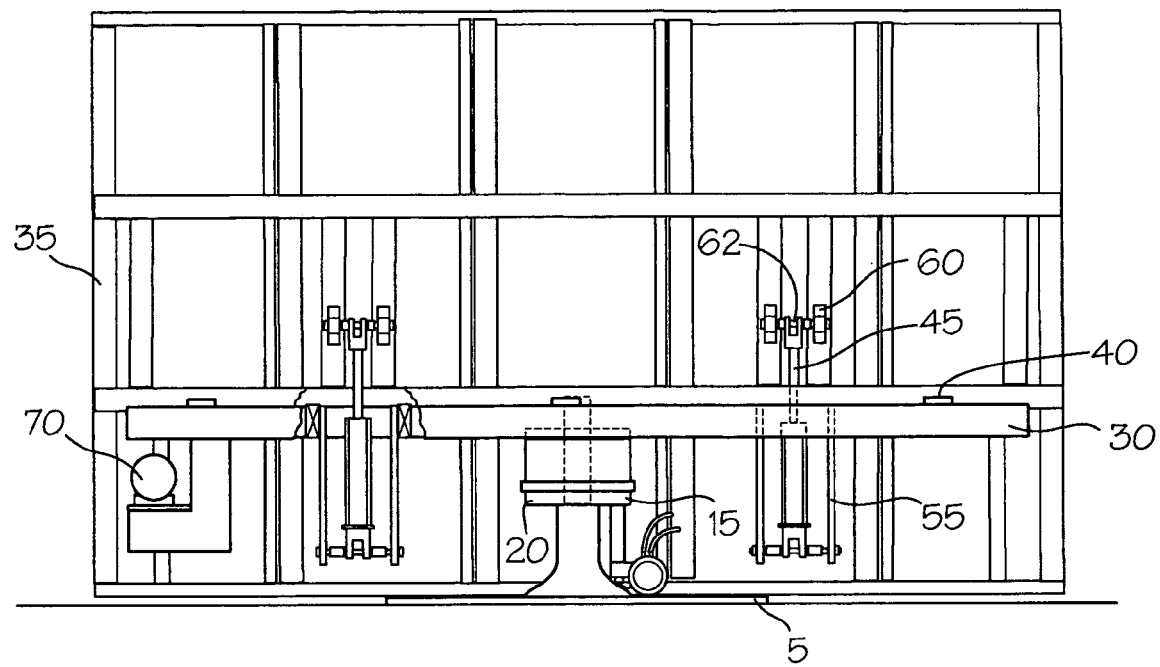
FIG. 4 is a side view of the cutting table of the present invention with the surface-scaffold positioned perpendicular to the rectangular frame.
Figure 5:
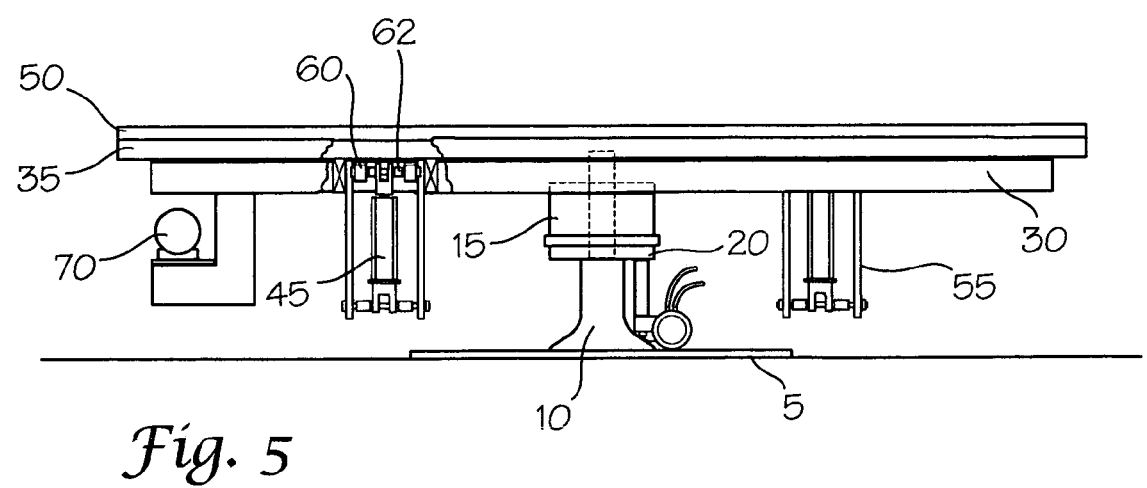
FIG. 5 is a side view of the cutting table of the present invention with the surface-scaffold flat upon the rectangular frame.

FIGS. 4 and 5 illustrate, respectively, the perpendicular and flat positions that the surface scaffold 35 can assume. The surface scaffold 35 has been cut-away on the left jack to illustrate the change in length of the jack as the table moves between the two positions.

FIG. 6 illustrates the lifting system for titling the work-surface 50 in greater detail, paying particular detail to the separate braking and lifting systems, that are both powered by pressurized air. An electrical hydraulic pump 70 attaches underneath the rectangular frame 30. A first hose system 77 connects the electrical hydraulic pump 70 to a hydraulic diverter valve 75. A second hose system 79 connects the hydraulic jacks 45 in parallel to the hydraulic diverter valve 75. The hydraulic diverter valve 75 is therefore in series with the first 77 and second hose systems 79.

To raise and lower the work surface 50 a user changes the pressure inside the hydraulic jacks 45. The hydraulic diverter valve 75 allows one to control the pressure applied to the jacks 50 via the second hose system 79.

To cut a large, stone work piece 100 using the cutting table thus described, a user first positions the work surface 50 perpendicular to the frame 30. Next, the user places a work piece 100 flat against the work surface 50 with an edge of the work piece 100 resting on the peg 54. Now, the user must lower the work surface 50 to a position placing the work surface 50 flat upon the frame 30. With the air brake not activated the user can rotate the work surface 50 to a predetermined angle. This might be done with or without the assistance of an angle gauge. One so positioned at the predetermined angle, the user activate the airbrake 20, thereby locking the work surface 50 in place. Finally, the user may proceed with cutting the work piece 100.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A table, comprising:
   a base;
   an axel having base and drum ends, the base end of the axel fixed to the base;
   a drum attached to the drum end of the axel;
   a brake between the axel and the drum, the brake having an active mode for stopping the drum from rotating around the axel, and a passive mode allowing the drum to rotate around the axel;
   a mounting-plate fixed to the drum;
   a rectangular frame fixed and balanced on the mounting plate;
   a surface-scaffold attached to the rectangular frame by at least one hinge, wherein the hinge allows the scaffold to move from a position flat upon the frame to a position perpendicular to the frame;
   a lifting means attached to the frame and the scaffold, whereby the lifting means moves the scaffold between a position flat on the frame to one perpendicular with the frame; and
   a work surface attached to and supported by the scaffold.

2. The table of claim 1, wherein the brake is an airbrake.

3. The table of claim 2, wherein the work surface is a poured slab of concrete.

4. The table of claim 3, further comprising:
   at least one notch along an edge of the work surface that is closest to the base when the work surface is in a position perpendicular to the frame, and wherein the notch is flush with the work surface; and
   at least one peg inserted in the notch, wherein the peg is perpendicular to the work surface, whereby the peg retains an edge of a work piece juxtaposed against the work surface.

5. The table of claim 4, wherein the lifting means are a pair of hydraulic jacks, each jack having an upper and lower end, and the jacks placed equal distances from the center of the drum, thereby maintaining balance.

6. The table of claim 5, further comprising:
   v-mounting brackets pivotally attaching, by a set of first pins, the lower end of the jacks to the rectangular frame, whereby the jacks rest below the frame when the scaffold lies flat on the frame; and
   scaffold brackets pivotally attaching, by a set of second pins, the upper end of the jacks to the scaffold, whereby when the jacks are fully extended the scaffold is perpendicular to the frame.

7. The table of claim 6, further comprising:
   an electrical hydraulic pump attached underneath the rectangular frame;
   a hydraulic diverter valve underneath the rectangular frame;

a first hose system connecting the electrical hydraulic pump to the hydraulic diverter valve;

a second hose system connecting the hydraulic jacks in parallel to the hydraulic diverter valve;

an air hose having first and second ends, the first end connecting to the brake;

an air release valve connecting to the second end of the air hose; and a pressurized air source connected in series with the air hose and the air release valve.

8. The table of claim 1, further comprising a plurality of base bolts for attaching the base to a surface, the base bolts in base.

9. The table of claim 1, further comprising a strut support, said strut support attached to the base and the axel at approximately forty-five degree angles.

10. The table of claim 1, further comprising an angle gauge for setting the work surface at a particular angle relative to a predetermined point.

11. The table of claim 10, wherein the angle gauge is a laser level aimed at the floor, and a beam of laser light projects from the laser level on to markings on the floor.

* * * * *